(12) United States Patent
Kurup (10) Patent No.: US 8,045,641 B2
(45) Date of Patent: Oct. 25, 2011

(54) ENCODING OF RFID

(75) Inventor: Dhanesh G Kurup, Uppsala (SE)

(73) Assignee: Wavelogics AB, Uppsala (SE)

( * ) Notice: Subject to any disclaimer, the term of this patent is extended or adjusted under 35 U.S.C. 154(b) by 1222 days.

(21) Appl. No.: 11/665,832

(22) PCT Filed: Oct. 13, 2005

(86) PCT No.: PCT/SE2005/001527
§ 371 (c)(1),
(2), (4) Date: Apr. 20, 2007

(87) PCT Pub. No.: WO2006/043876
PCT Pub. Date: Apr. 27, 2006

(65) Prior Publication Data
US 2008/0001750 A1    Jan. 3, 2008

(30) Foreign Application Priority Data
Oct. 22, 2004   (SE) ...................................... 0402571

(51) Int. Cl.
*H04L 27/00*   (2006.01)
(52) U.S. Cl. .................. 375/295; 340/12.32; 340/12.33; 340/12.51
(58) Field of Classification Search .................. 375/295; 327/291; 332/106; 341/20, 173
See application file for complete search history.

(56) References Cited

U.S. PATENT DOCUMENTS

| | | | |
|---|---|---|---|
| 3,588,727 A * | 6/1971 | Seidel | 330/287 |
| 5,539,775 A | 7/1996 | Tuttle et al. | |
| 5,966,048 A * | 10/1999 | Thompson | 330/124 R |
| 7,133,480 B2 * | 11/2006 | Colborne et al. | 375/355 |
| 7,432,814 B2 * | 10/2008 | Dietrich et al. | 340/572.4 |
| 2001/0001758 A1 | 5/2001 | Greeff et al. | |
| 2004/0027240 A1 | 2/2004 | Greeff et al. | |
| 2004/0120309 A1 * | 6/2004 | Kurittu et al. | 370/352 |
| 2005/0099222 A1 * | 5/2005 | Yang et al. | 327/404 |
| 2005/0159187 A1 * | 7/2005 | Mendolia et al. | 455/562.1 |
| 2007/0025420 A1 * | 2/2007 | Dong | 375/130 |
| 2007/0040606 A1 * | 2/2007 | Zhou et al. | 329/347 |
| 2010/0251877 A1 * | 10/2010 | Jochelson et al. | 84/609 |

FOREIGN PATENT DOCUMENTS

GB    2 165 423    4/1986

OTHER PUBLICATIONS

Extended European Search Report, dated Oct. 6, 2008 and issued in corresponding European Patent Application No. 05792425.0-2210.

* cited by examiner

*Primary Examiner* — David C. Payne
*Assistant Examiner* — Erin File
(74) *Attorney, Agent, or Firm* — Young & Thompson (57) ABSTRACT

A method is disclosed for generating data encoded RF (radio frequency) waveform without a separate memory device/chip. The hardware in the proposed method consists of entities performing the operations of time-delay (B), phase shifting (C), attenuation, power dividing (D) and power combining (E). An integral part of the invention is the application of the method in designing radio frequency identification devices or RFID-tags.

15 Claims, 6 Drawing Sheets

ENCODING OF RFID

TECHNICAL FIELD

The present invention relates to a method for generation of an encoded waveform and more precisely to a simplified method for producing radio frequency identification (RFID) tags.

BACKGROUND

Two widely used methods for identifying objects today are barcodes and magnetic strips. Bar codes are commonly used for identifying objects in shops and supermarkets. An application of magnetic strips is the credit card. The main reason for the popularity of barcodes and magnetic strips is that they are inexpensive. One drawback of barcodes and magnetic strips is the distance range in which they can be used. The reader has to have a physical contact or has to be very close, say a few centimetres. If there is no physical contact, then the space between the code and the reader should not have any obstruction. In addition, the reader and the code have to be properly aligned for correct readability. This demands concentration from the part of the human operator and therefore is inconvenient.

RFID (radio frequency identification) tag (or RFID-tag) is another technology used for identifying the identity of an object. In an RFID system, the interrogator or the reader and the tag can be separated by a larger distance compared to that of the magnetic strip technology or the bar-code technology. Once interrogated by the reader, RFID-tags will return an encoded radio signal that contains the identity of the object. RFID-tag devices can be broadly divided based on the criteria weather they contain an integrated memory chip or not. Those that contain a memory chip, e.g. U.S. Pat. No. 5,874,902, in general have more memory capacity than those of chip-less tags, e.g. U.S. Pat. No. 6,708,881. However, chip based tags have a significantly higher cost compared to that of the chip-less tags. RFID-tags can also be divided based on the criteria weather they contain a battery or not, active and passive tags. In general active tags, which are the most commonly available tags in market today, have a larger operational distance range when compared to the passive tags, e.g. U.S. Pat. No. 6,621,417.

SUMMARY OF THE INVENTION

The invention relates to the method of generating a RF waveform containing a code at a remote point but not encoded using a memory chip. The underlying assumption in the above method is that there is the availability of a set of finite duration RF waveforms of different frequencies. These waveforms can be generated prior locally or can be made available through antennas wirelessly at the remote point. These finite duration signal bursts can be conveniently called hereafter as the mother signals. In order to generate the coded RF waveform, the mother signals are processed in time, frequency, phase and amplitude domain, whereby a set of child signals are produced and further processing of child signals or the mother signals are directly manipulated in time, frequency, phase and amplitude domain. The processing steps are achieved by means of RF passive devices such as time delays, phase shifters attenuators, power combiners and power dividers. The main difference in characteristics between the mother signals and child signals are their power and spectral characteristics. One of the main application area of the above method is in the RFID (Radio Frequency Identification) arena for generation of the tags. In RFID applications, the duration and shape of the finite duration signals are chosen such that the final encoded waveform will obey the power and bandwidth criteria imposed by the regulatory bodies.

BRIEF DESCRIPTION OF THE DRAWINGS

The invention, together with further objects and advantages thereof, may best be understood by referring to the following detailed description taken together with the accompanying drawings, in which.

DETAILED DESCRIPTION

In a preferred embodiment the invention can be described as follows:

Assume the presence of K finite duration RF (radio frequency) signals $S_i^M$ the mother signals of different frequencies locally for given duration $T_i$, $1 \leq i \leq K$. A binary on-off keyed waveform, for example a sinusoidal wave of fixed duration when ON and zero signal when OFF is an example of a mother signal, see FIG. 1. However the mother signals may also attain other shapes, but with the fixed duration similar to that of FIG. 1.

Figure 1:
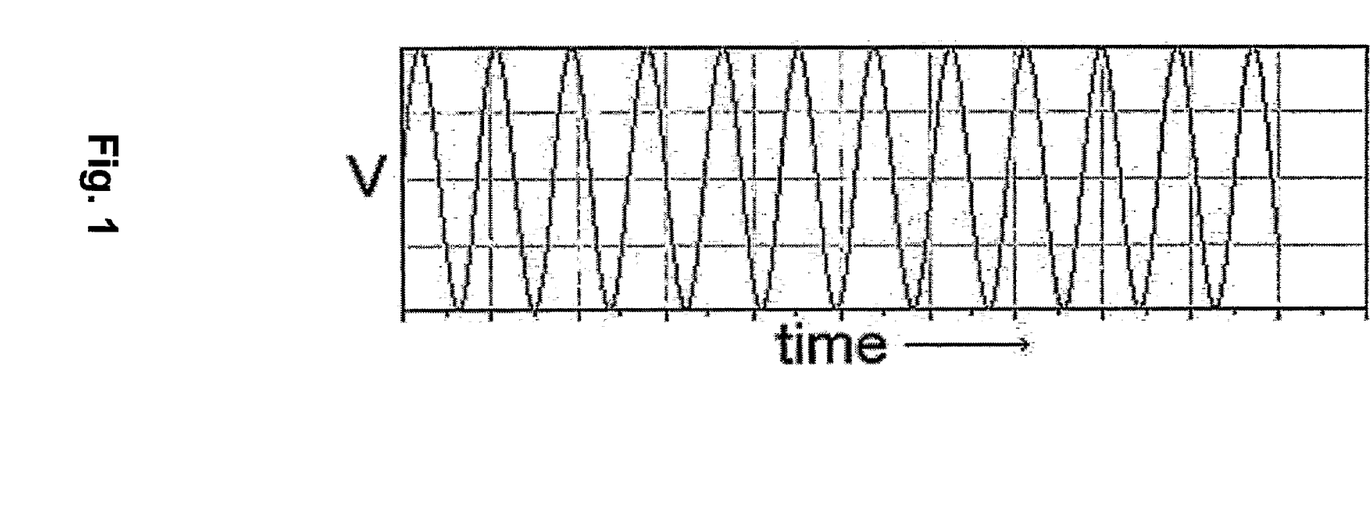
FIG. 1 is an example of a finite duration mother signal.
Figure 2:
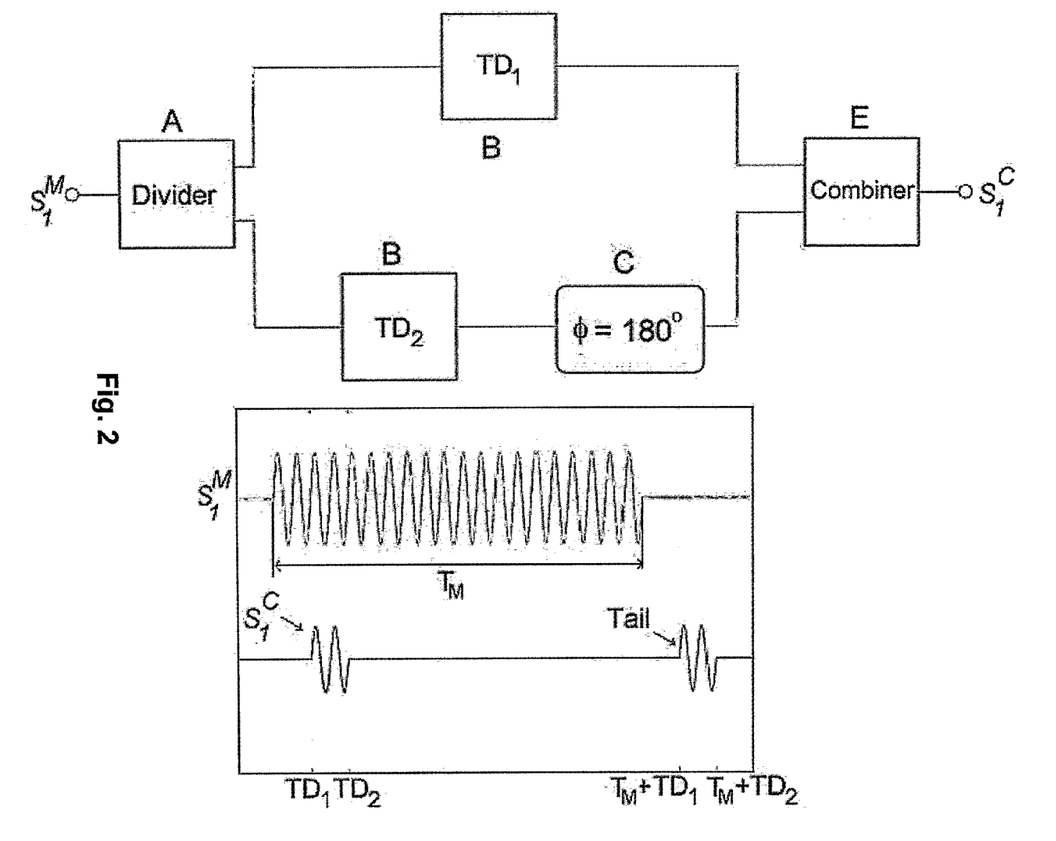
FIG. 2 illustrates generation of a child signal from a mother signal.

The invention relates to the generation of further K signals, $S_j^C$ referred to as child signals with duration $T_j$, $1 \leq j \leq K$. using RF time-delays, phase shifters power dividers and power combiners. It is to be noted that $T_j < T_i$. FIG. 2 is an example of generating one child signal from a mother signal of one particular frequency and type shown in FIG. 1. As can be seen in FIG. 1, first a two way power divider (see FIG. 2, block A) splits the mother signal $S_i^M$ into two branches with equal power and are subsequently passed through two unequal delays $TD_1$ and $TD_2$ (see FIG. 2, blocks B). In one branch, in addition to the time-delay there is phase shifter of angle $\Phi°$ (see FIG. 2, block C). $\Phi$ is adjusted such that phase difference between the signals in the two branches at the input of the power combiner (see FIG. 2, block E) is 180°. The combination of the signals in the two branches using the two way power combiner (see FIG. 2, block E) result in the child signal $S_1^C$ of duration $|TD_2-TD_1|$ together with a tail signal of duration $|TD_2-TD_1|$.

As can be seen in FIG. 2, the appearance of the tail is marked by a gap in time of $(T_M-|TD_2-TD_1|)$ from the disappearance of child signal. It is to be noted that the delays and the duration of the mother signal are selected such that the encoded waveform is produced according to the operations described as follows.

Each child signal from a particular mother signal can be multiplied or cloned into several child signals of same shape by means of a power divider. By subjecting each such child signal to time-delays and (or) phase shifting and (or) attenuation and then combining, we can produce a signal string having the properties of an encoded RF signal. First we demonstrate this idea by generating an encoded signal string containing an N bit data. Next we demonstrate the generation of signal string from two different child signals (two different frequencies), containing N-1 bits of data.

Figure 3:
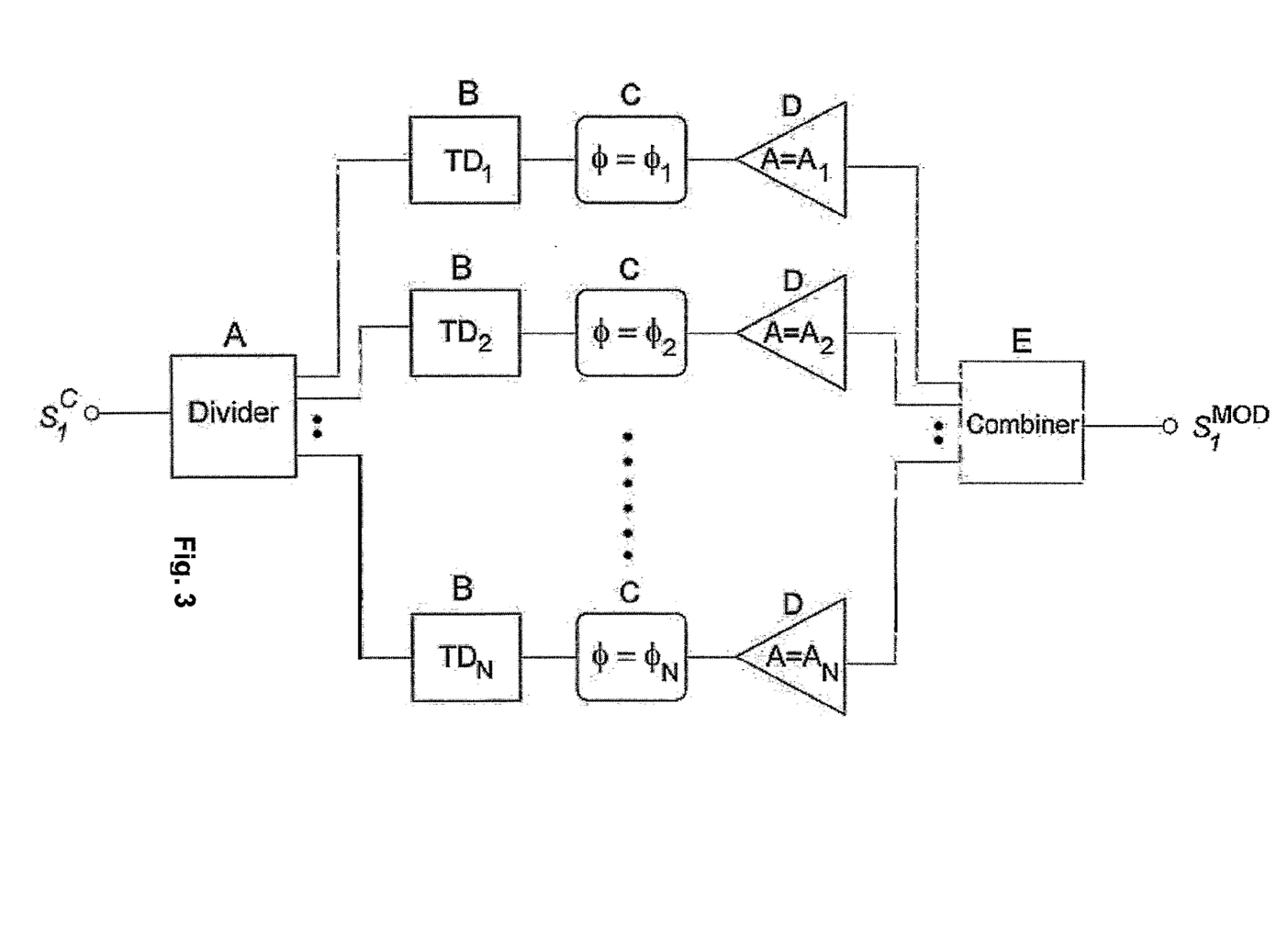
FIG. 3 illustrates generation of an encoded PSK or ASK or PPM modulated signal string from a child signal.

FIG. 3 shows a general block diagram showing the generation of a signal string from a single child signal produced from a mother signal of one particular frequency containing an N bit data having the properties of either PSK (phase shift keying), ASK (amplitude shift keying) or PPM (pulse position modulation). FIG. 3 consists of an N way power divider (see FIG. 3, block A), N time-delays (see FIG. 3, blocks B), N phase shifters (see FIG. 3, blocks C), N attenuators (see FIG. 3, blocks D) and an N way power combiner (see FIG. 3, block E). The various signal string formats can be derived as follows.

PSK signal string: Choose attenuators (see FIG. 3, blocks D) to be either absent or attenuation values to be zero. Choose $TD_j = j \times T_C$, j=1 to N, where $T_C$ is the duration of child signal $S_1^C$ at the input of the power divider (see FIG. 3, block A). Choose the phase shifters ($\phi_j^\circ$, see FIG. 3, blocks C), such that the total phase shift is 0° if $b_j=1$ and total phase shift is 180° if $b_j=0$. Then the signal string $S_1^{MOD}$ resembles a PSK waveform encoded with N bits of data, $b_1, b_2 \ldots b_N$.

ASK signal string: Choose phase shifting to be zero for the phase shifters (see FIG. 3, blocks C) or phase-shifters to be excluded. Choose $TD_j = j \times T_C$, j=1 to N, where $T_C$ is the duration of child signal $S_1^C$ at the input of the power divider (see FIG. 3, block A). Choose attenuation of attenuators (see FIG. 3, blocks D) to be $A_j=0$ if bit $b_j=1$ and $A_j=$infinity if $b_j=0$. Then the signal string $S_1^{MOD}$ resembles an ASK waveform encoded with N bits of data, $b_1, b_2 \ldots b_N$.

PPM signal string: Choose phase shifting to be zero for the phase shifters (see FIG. 3, block C) or phase shifters to be excluded. Choose for the attenuators (see FIG. 3, block D) the attenuation values to be zero. Choose $TD_j - TD_{j-1} = t_0$ for bit $b_j=0$ and $TD_j - TD_{j-1} = t_1$ for bit $b_j=1$ where $t_0 \neq t_1$ and j=2 to N. Then the signal string $S_1^{MOD}$ resembles a PPM waveform encoded with N-1 bits of data, $b_1, b_2 \ldots b_{N-1}$.

Figure 4:
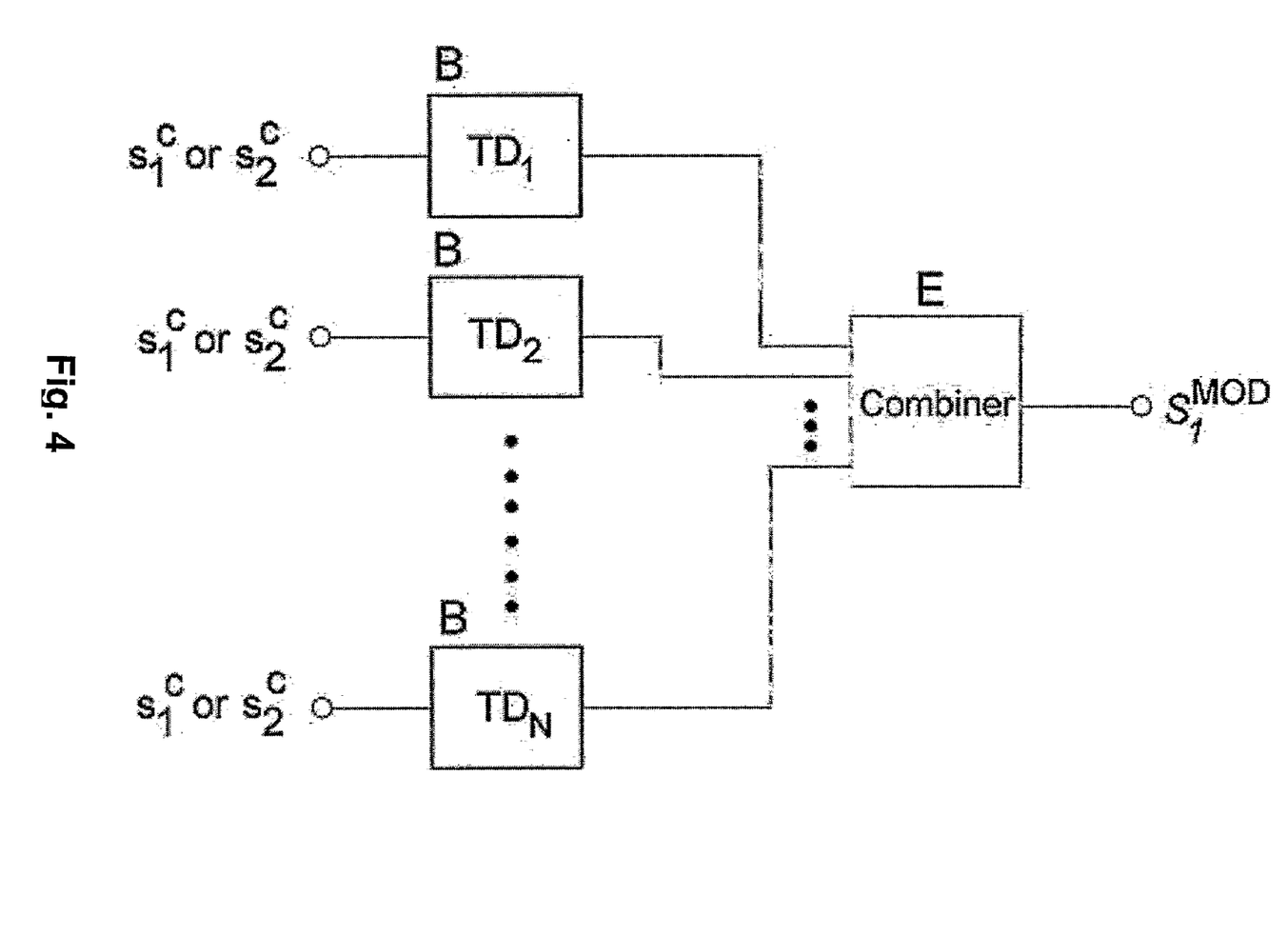
FIG. 4 illustrates generation of an encoded FSK signal string from two different child signals.

FSK signal string: A FSK signal string is formed using a different method compared to that of FIG. 3 because of the requirement of two different child signals from different mothers having different frequencies. FIG. 4 shows in part the method to produce an FSK signal string. This assumes the presence of two different child signals of different frequencies $s_1^c$ or $s_2^c$, see FIG. 4. The input to the time-delays, see FIG. 4, depends on the bit to be programmed. If bit $b_j=0$ choose $s_1^c$ as the input else choose $s_2^c$. Choose $TD_{j=j \times TC}$, j=1 to N, where $T_C$ is the duration of child signal $s_1^c$ or $s_2^c$, (see FIG. 4, block B). A FSK signal string will result when the delayed versions of the child signals are combined using an N-way divider, (see FIG. 4, block E). Let the number of $s_1^c$ in the signal string be m. We can derive the $s_1^c$ by using an m way power divider after $S_1^C$ in FIG. 2. In a similar way we can derive $s_2^c$ from $S_2^C$.

Figure 5:
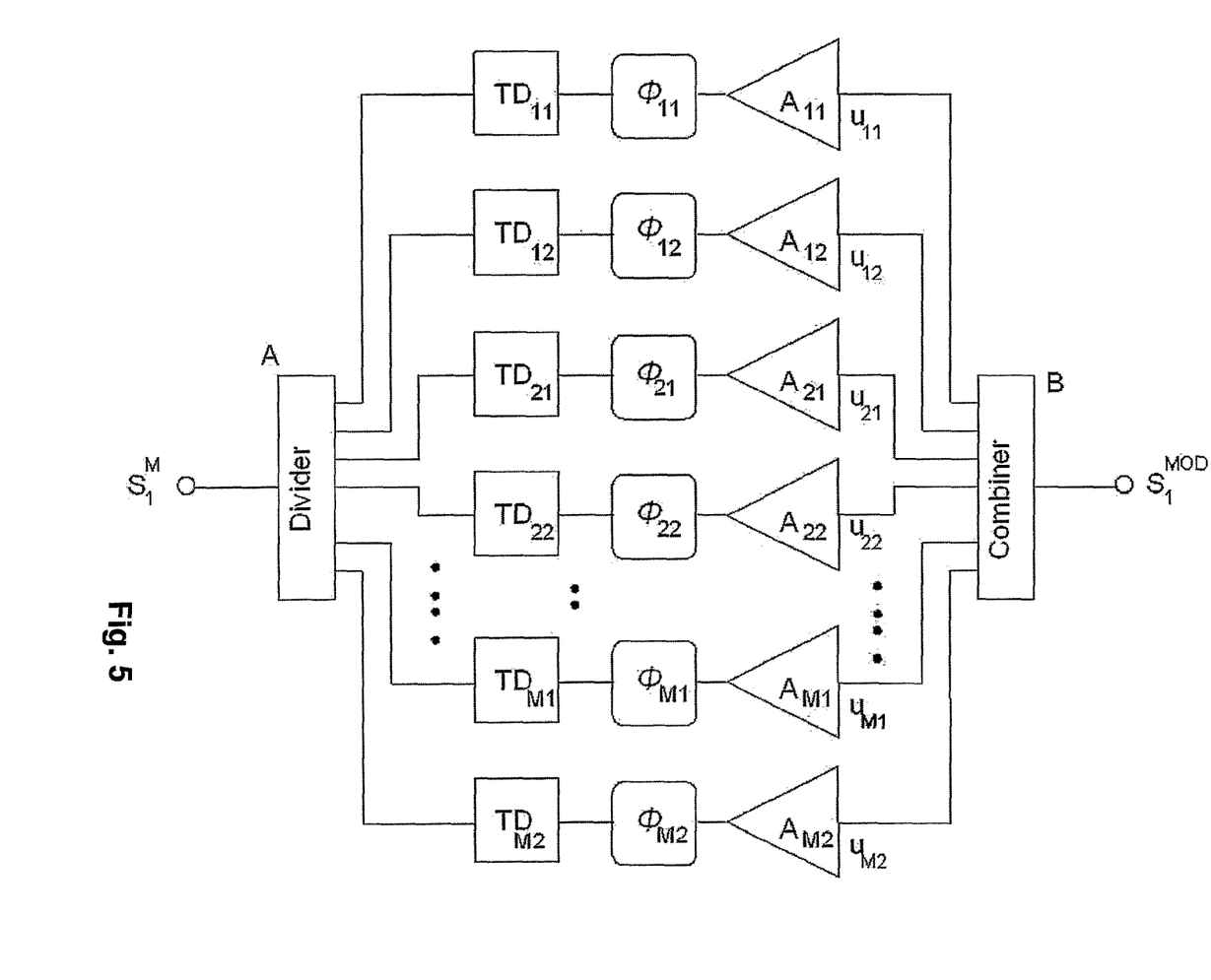
FIG. 5 illustrates an alternative realization of the generation of ASK or PPM signal from a mother signal.

In another embodiment, certain modulated signal string formats can be generated by not explicitly generating a child signal and dividing the child signal, as shown in FIG. 3. This idea can be explained with respect to FIG. 5. In this embodiment, the mother signal of one particular frequency $S_1^M$ is directly divided by means of N-way power divider where N is an even number, (see FIG. 5 block A). Outputs of the power divider are passed through branches which contain time delays $T_{ij}$, phase shifters $\Phi_{ij}$ and attenuators $A_{ij}$ in arbitrary order where $1 \leq i \leq M$, $1 \leq j \leq 2$ and N=2M. The operations of time delays, phase shifting and attenuation, which the signals undergo in each branch is such that when the signals pairwise meet they are 180 degree out of phase. As shown in FIG. 5 the signal pairs 180 degree out of phase are $u_{i1}$, $u_{i2}$, where $1 \leq i \leq M$. By imposing the additional constraint on the values of the delays that $T_{11} < T_{12} < T_{21} \ldots < T_{M1} < T_{M2}$, the modulated signal format $S_1^{MOD}$ generated in this embodiment are amplitude modulated or ASK and position modulated or PPM signals.

Figure 6:
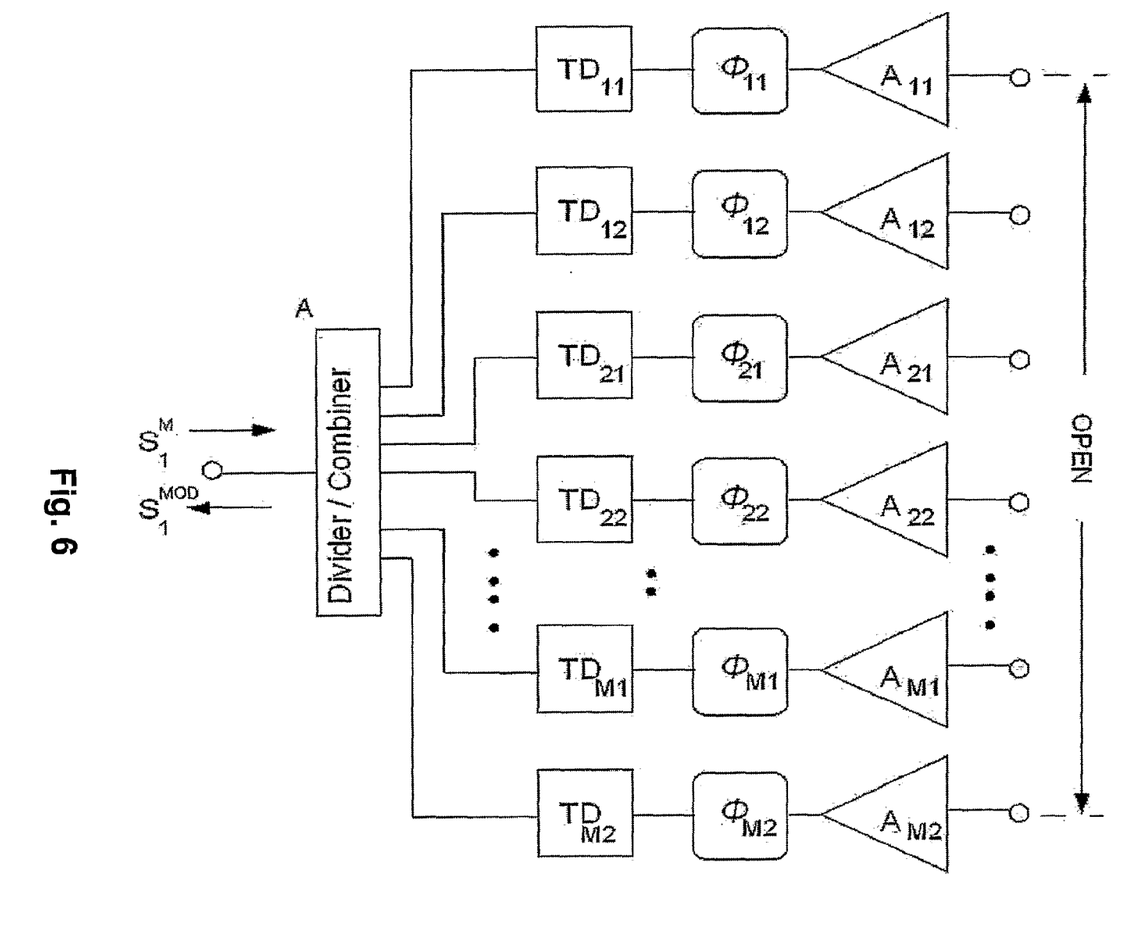
FIG. 6 illustrates an alternative realization of the generation of ASK or PPM signal from a mother signal.

In another embodiment, see FIG. 6, the reciprocity property of RF power dividers, attenuators, time delays and phase shifters will be used to exclude the need of power combiner in FIG. 5. As shown in FIG. 6, instead of power combiner in FIG. 5, each branch following the divider/combiner (block A in FIG. 6) is terminated with an open circuit, where the incident signals will get reflected. The reflected signals from each branch therefore will pass through the reciprocal delays, phase shifters and attenuators in the reverse direction and finally through block A, which acts like a combiner in the reverse direction. An example of block A in FIG. 6 is the Wilkinson's divider/combiner. The delayed signal reflected out at the point where the signal enters at block A will have same property as in $S_1^{MOD}$ of FIG. 5 if the values of the delays, attenuation and phase shifting in FIG. 6 are half that of FIG. 5. Therefore the embodiment described in FIG. 6 will have same functionality as that of FIG. 5 with the additional advantage of reduced size.

Application to RFID Systems

The method described above can be used to construct an RFID-tag and a reader to decode the encoded RF waveform emitted by the RFID-tag. The RFID-tag can be considered as an interconnection of the following building blocks.

1. An antenna to receive mother signals from the reader or the mother signals is generated locally using an oscillator. The DC power to the oscillator can be derived using rectification of RF power from the reader or via a battery.

2. Building blocks to generate the data encoded RF waveform is based on a given modulation format as described above.

3. Optional building blocks such as amplifiers are used for increasing the power of the encoded waveform.

4. An antenna is used to transmit the data encoded RF waveform.

The reader is designed in such a way to decode the above encoded waveform.

It will be understood by those skilled in the art that various modifications and changes may be made to the present invention without departure from the scope thereof, which is defined by the appended claims.

The invention claimed is:

1. A method for generating a modulated waveform in a radio frequency identification (RFID) system tags, said method comprising:

providing K signals $S_i^M$ referred to as mother signals of duration $T_i^M$ and frequencies $F_i$, where i=1 to K and $K \geq 1$;

generating from said K mother signals K further signals of duration $T_i^C$ referred to as child signals $S_i^C$, where $T_i^C < T_i^M$;

dividing each of said child signal corresponding to each mother signal by means of a powder divider into $N_i$ branches resulting in further $N_i$ child signals where $N_i \geq 2$;

introducing different delays $TD_j^i$ to said $N_i$ further child signals after power division, wherein said delays being defined according to a predetermined modulation scheme to be either $TD_j^i = j \times T_i^C$, where j=1 \ldots $N_i$, or $TD_j^i - TD_{j-1}^i = t_x$, where j=2 \ldots $N_i$ and $t_x = t_0$ for a binary zero and $t_x = t_1$ for a binary one with $t_0 \neq t_1$; and forming a signal string by combining said $N_i$ signals, wherein said signal string will be interpreted as a data encoded signal corresponding to the mother signal i carrying an identification information.

2. The method according to claim 1, further comprising introducing different phase shifting before combining said $N_i$ child signals.

3. The method according to claim 1, further comprising introducing different attenuation before combining said $N_i$ child signals.

4. The method according to claim 1, further comprising setting the amplitude of child signals to be zero for a binary zero and a non-zero amplitude for binary one in the series $1 < j \leq N_i$, thereby forming said signal string as an on/off keyed binary signal of $N_i$ bits.

5. The method according to claim 1, further comprising setting the phase of child signal corresponding to a binary one to be 180 degree out of with those corresponding to binary zero, thereby forming said signal string as a phase shift keyed (PSK) binary coded signal of $N_i$ bits.

6. The method according to claim 1, further comprising combining child signals corresponding to a binary one to have a different frequency to that of the child signal having binary zero to form said child signal string as a frequency shift keyed (FSK) signal.

7. A method for generating a modulated waveform comprising:
provide K signals referred to as mother signals $S_i^M$ of duration $T_i$ and frequencies $F_i$, where $i=1$ to K and $K \geq 1$;
dividing each of said K mother signals into $M_i$ pairs of signals $u_{k1}, u_{k2}$ in $N_i$ branches by means of an $N_i$-way power divider where $N_i \geq 2$, $N_i = 2M_i$, $1 \leq k \leq M_i$;
introducing different delays $TD_j$ to and phase shifts $\Phi_j^\circ$ to said $M_i$ pairs of signals after power division, wherein said delays being defined according to a predetermined modulation scheme to either be $TD_j = j \times T_i$ or $TD_j - T_{j-1} = t_x$, where $t_x = t_0$ for a binary zero and $t_x = t_1$ for a binary one with $t_0 \neq t_1$, wherein said phase shifts are defined such that the signals $u_{k1}, u_{k2}$ in each signal pair are 180° out of phase; and
forming a signal string by combining said $M_i$ pairs of signals, wherein said signal string will be interpreted as a data encoded signal carrying identification information.

8. The method according to claim 7, further comprising introducing different attenuations $A_{k1}$ to said $M_i$ pairs of signals after power division, wherein said time delays, said phase shifts and said attenuations are defined such that the signal $u_{k1}, u_{k2}$ in each signal pair is 180° out of phase.

9. The method according to claim 7, further comprising combining all the $N_i$ branches using an $N_i$-way power combiner.

10. The method according to claim 7, wherein said delays in said $N_i$ branches are defined such that $TD_1 < TD_2 < \ldots < T_{N_i}$.

11. The method according to claim 7, further comprising connecting an open circuit at the end of each branch thereby causing reflection of said $N_i$ signals in each branch at said open circuit.

12. A radio frequency identification, RFID, tag comprising:
a signal provider configured to provide K signals referred to as mother signals $S_i^M$ of duration $T_i$ and frequency $F_i$, where $i=1 \ldots K$ and $K \geq 1$;
a circuitry configured to generate from said K mother signals K further signals of duration $T_i^C$ referred to as child signals $S_i^C$, where $T_i^C < T_i^M$, said circuitry comprising:
a two-way power divider configured to split a mother signal $S_i^M$ into two signals with equal power, said two-way power divider being connected to a first branch and a second branch; and
a two-way power combiner connected to said first branch and said second branch and configured to combine said two signals into a child signal;
said first branch comprising a first time delay;
and said second branch comprising a second, different time delay and a phase shifter of angle $\Phi^\circ$, where $\Phi$ is adjusted such that a phase difference between said two signals at said power combiner is 180°;
a power divider configured to divide each of said child signals corresponding to each mother signal into $N_i$ branches resulting in $N_i$ further child signals, where $N_i \geq 2$;
a respective delay $TD_j^i$ arranged in said $N_i$ further branches to introduce different delays to said $N_i$ child signals after power division, wherein said delays being defined according to a predetermined modulation scheme to be either $TD_j^i = j \times T_i^C$, where $j=1 \ldots N_i$, or $TD_j^i - TD_{j-1}^i = t_x$, where $j=2 \ldots N_i$ and $t_x = t_0$ for a binary zero and $t_x = t_1$ for a binary one with $t_0 \neq t_1$; and
a power combiner configured to form a signal string by combining said $N_i$ signals, wherein said signal string will be interpreted as a data encoded signal corresponding to mother signal i carrying identification information.

13. A radio frequency identification, RFID, tag comprising:
a signal provider configured to provide K signals referred to as mother signals $S_i^M$ of duration $T_i$ and frequency $F_i$, where $i=1 \ldots K$ and $K \geq 1$;
a power divider configured to divide each of said K mother signals into $M_i$ pairs of signals $u_{k1}, u_{k2}$ in $N_i$ branches, where $N_i \geq 2$ and $N_i = 2M_i$, $1 \leq k \leq M_i$;
each of said $N_i$ branches comprises a respective time delay $TD_j$ and a respective phase shifter $\Phi_j$, wherein each delay being defined according to a predetermined modulation scheme to either be $TD_j = j \times T_i$ or $TD_j - TD_{j-1} = t_x$, where $t_x = t_0$ for a binary zero and $t_x = t_1$ for a binary one with $t_0 \neq t_1$ and said phase shifters are defined such that the signals $u_{k1}, u_{k2}$ in each signal pair are 180° out of phase; and
a power combiner connected to said $N_i$ branches and configured to form a signal string by combining said $M_i$ pairs of signals, where said signal string will be interpreted as a data encoded signal carrying identification information.

14. A method for generating a modulated waveform in a radio frequency identification, RFID, system, comprising:
dividing a mother signal $S_1^M$ of duration $T_M$ by a two-way power divider into two signals with equal power;
delaying a first signal of said two signals with a first time delay; and
delaying a second signal of said two signal with a second, different time delay;
phase shifting said second signal with an angle $\Phi^\circ$, where $\Phi$ is adjusted such that a phase difference between said two signals is 180° when combining said signals; and
forming a child signal $S_1^C$ and a tail signal of duration $T_C$ by combining said signals, where $T_C < T_M$.

15. A device for generating a modulated waveform in a radio frequency identification, RFID, system, comprising:
a two-way power divider configured to divide a mother signal $S_1^M$ of duration $T_M$ into two signal with equal power;

a first time delay configured to delay a first signal of said two signals;

a second, different time delay configured to delay a second signal of said two signals;

a phase shifter configured to phase shift said first signal with an angle $\Phi°$, where $\Phi$ is adjusted such that a phase difference between said two signals is 180° when combining said signals; and a two-way power combiner configured to form a child signal $S_1^C$ and a tail signal of duration $T_C$, by combining said signals, where $T_C < T_M$.

* * * * *